Aug. 19, 1969 R. S. McKINNON 3,461,955
HEAT EXCHANGE APPARATUS
Original Filed March 30, 1966
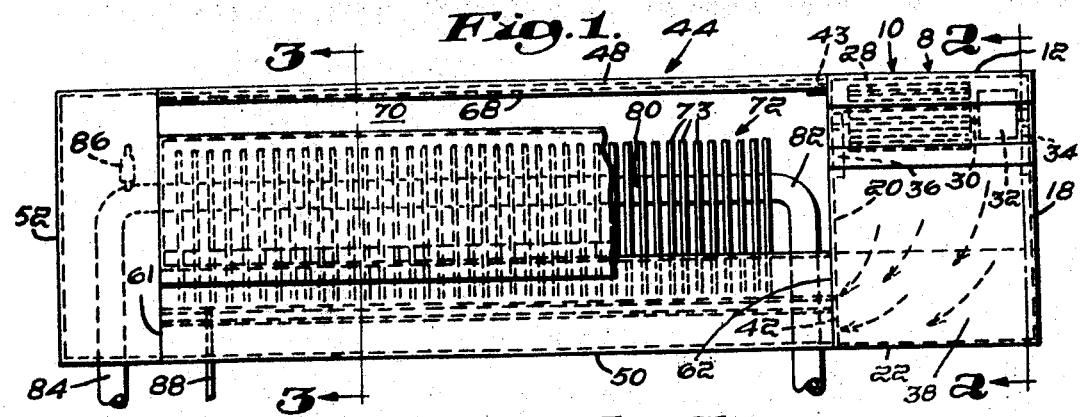
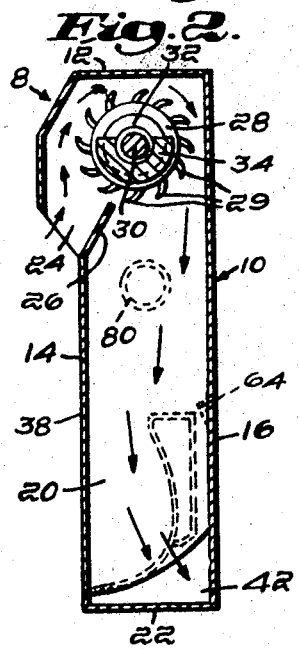
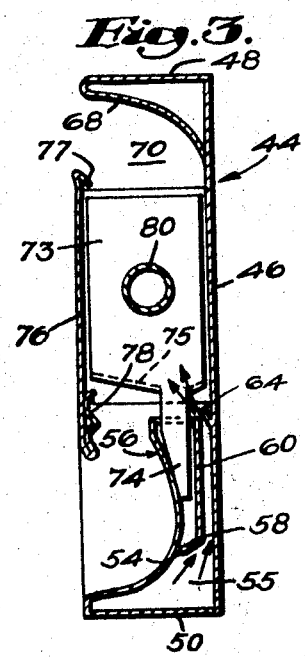
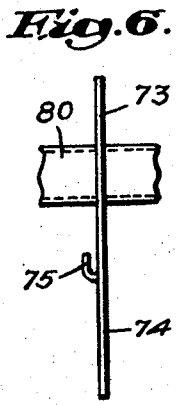
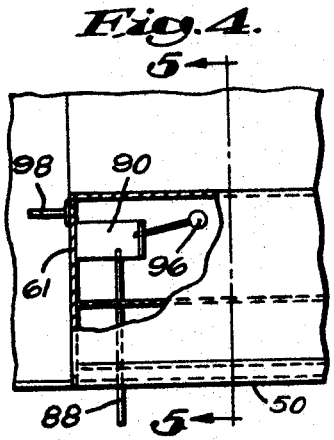
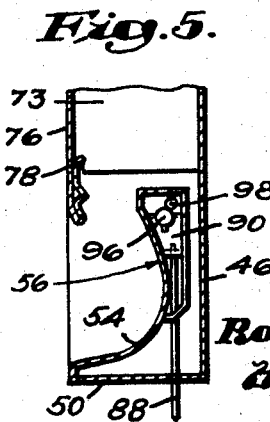
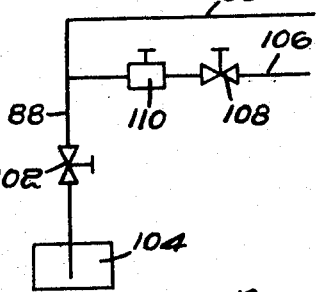
Inventor:
Robert S. McKinnon,
by Harold E. Cole
Attorney

United States Patent Office 3,461,955
Patented Aug. 19, 1969

3,461,955
HEAT EXCHANGE APPARATUS
Robert S. McKinnon, 124 Temple St., West Roxbury, Boston, Mass. 02132
Continuation of application Ser. No. 538,820, Mar. 30, 1966. This application Mar. 25, 1968, Ser. No. 715,691
Int. Cl. F28f *13/12;* F24f *3/04*
U.S. Cl. 165—123      6 Claims

ABSTRACT OF THE DISCLOSURE

Apparatus to heat or cool, and humidify as desired. A blower at one side has an air inlet and an air outlet communicating with a receiving passage of a heat exchange device having a container to hold liquid. A heat exchanger is directly above said receiving passage and has fin portions that extend into said container.

---

This is a continuation of my pending patent application, Ser. No. 538,820, filing date Mar. 30, 1966 now abandoned.

One object of my invention is to provide means, when my apparatus is used to cool a room, to carry away moisture resulting from condensation on the heat exchanger, using a container that also serves as a humidifying means at another time.

Another object is to provide a special air passage into which said container extends and receives part of a heat exchanger whereby liquid in said container can be heated in an unusually short time to provide a humidifying effect.

A still further object is to provide such apparatus that is economical to produce and install, and which can be operated at no greater cost than other apparatus that cannot perform all of the aforesaid operations.

The foregoing and other objects which will appear as the nature of the invention is better understood, may be accomplished by a construction, combination and arrangement of parts such as is disclosed by the drawing. The nature of the invention is such as to render it susceptible to various changes and modifications, and therefore, I am not to be limited to the construction disclosed by the drawing, nor to the particular parts described in the specification; but am entitled to all such changes therefrom as fall within the scope of my claims.

In the drawing:
FIG. 1 is a front elevational view of my apparatus.
FIG. 2 is an enlarged, sectional view taken on the line 2—2 of FIG. 1.
FIG. 3 is an enlarged, sectional view taken on the line 3—3 of FIG. 1.
FIG. 4 is a fragmentary, front elevational view, partly in section, showing a float valve in said container and connected to a conduit.
FIG. 5 is a sectional view taken on the line 5—5 of FIG. 4.
FIG. 6 is a fragmentary, elevational view showing a heat exchanger fin attached to a conduit.
FIG. 7 is a diagrammatic view showing supply conduits with valves for use to supply humidifying liquid when desired.

As illustrated, my apparatus has actuating means shown as a blower device 8. It includes a housing 10 having a top 12, a front 14, a rear or back 16, a right side 18, a left side 20 and a bottom 22 which are joined to form a housing. Said front 14 has an upper, outer air inlet opening 24 from which a baffle 26 extends diagonally inward to guide entering air towards a blower or fan 28 having the usual blades 29. Said blower 28 has a shaft 30 rotatably driven by a well-known motor 32, which shaft is rotatably mounted in a support 34 attached to said right side 18 and in a support 36 attached to said left side 20.

The lower corner portion of said side 20 is cut away to provide an outlet passage 42 which is triangularly shaped whereby the blower device 8 and a heat exchange device 44 communicate to provide for the flow of air from the blower device 8 to the heat exchange device 44 and thence into a room or other outer space.

Extensions 43 extend beyond said side 20 to connect said device 8 to said heat exchange device 44. The latter has a back plate 46, a top 48, a bottom 50 and an outer side cover 52, joined together. Said side 20 serves as a side for said heat exchange device 44. A bracket 43 attaches said heat exchange device 44 to said blower device 8.

A divider member or passage guide 54 extends upwardly from the front end of said bottom 50 having a curved portion as shown. It defines a passage 55 in said heat exchange device 44 and a portion thereof forms the front of a container 56 for liquid, such as water.

Said container 56 has a bottom 58 extending rearwardly from said passage guide 54 and it has a back member 60 joined thereto. The latter extends upwardly parallel to and spaced forwardly from said back plate 46. Said container back member 60 serves as a guide to narrow the upper portion of said passage 55 to define an outlet passage that is opposite said container 56.

Opposite ends 61 and 62 complete said container 56 which is open at the top and is widened at this point to receive fin extensions 74 later described. Said dividing member 54 together with said back 46 determine the shape of said passage 55, providing a constricted one at the top and relatively large air passage at the bottom, and forming part of the heat exchange device 44. A baffle member 64 is attached to said back 46 and extends diagonally into the outlet of said passage 55 opposite said container 56, further narrowing the upper portion thereof.

At the upper portion of said heat exchange device a guide member 68 extends substantially diagonally from said top 48 downwardly thereby defining an air outlet passage 70 below said top 48, through which air from my apparatus passes into a room.

Intermediate said passages 55 and 70 is a heat exchanger 72 having fins 73 spaced apart and that have lower extensions 74 that taper in width downwardly towards said container back 60. The bottom of said fins except for said lower extensions 74 are preferably turned up as at 75 to provide open troughs to catch condensation or dripping from the fin portion above, which then drops therefrom into said container 56.

A removable front 76 is spaced from said bottom 50 and top 48 being held by attaching members 77 and 78 that respectively fasten said front to the top of said heat exchanger 72 and to said back 46.

Extending through the center of said fins 74 said heat exchanger 72 has a conduit 80 through which hot water flows, or it could be chilled water for air conditioning. A feed pipe 82 communicates with said conduit 80 and extends to a supply source not shown. An outlet conduit 84 for said heat exchanger extends to the supply source also and it has the usual air valve 86 connected thereto. Said container 56 has a conduit 88 shown broken away, to carry away any condensate liquid and for other purposes later explained.

Said container 56 may serve as part of a humidifying apparatus, as in cold weather, in which event a well-known float valve 90 is provided for it which is operably connected to said conduit 88 and has a float ball 96 and also an overflow pipe 98.

In the use of my apparatus as a humidifier, a gate valve 102 is provided in said conduit 88, which is ordinarily kept closed in cold weather. Below it is a catch basin 104 connected to said conduit 88 to drain said container 56 when that is desirable, as in warm weather.

Water or other liquid for humidifying purposes is supplied through a supply conduit 106 that has a gate valve 108 that is kept open, or partly open, when humidification is sought. Beyond said valve 108 is a pressure reducing valve 110 in said supply conduit 106. When said valve 108 is open water from an outside source, not shown, flows through conduit 106 and thence into conduit 88 which keeps said container 56 at a predetermined level by means of the operation of said float valve 90.

In cool weather when heat is required said valve 90 is opened and valve 102 is closed, and said conduit 88 serves as a liquid supply pipe for said container 56. In warm weather said valve 90 is closed and valve 102 is opened, and said conduit 88 serves as a drain pipe to carry water away from said container 56 into said basin 104.

What is claimed is:

1. Heat exchange apparatus, comprising a housing, blower means in said housing, a heat exchange device connected to said housing and in the path of air from said blower means, said housing having an inlet passage means to receive air from said blower means, a second passage to permit escape of air from said blower means, said heat exchange device having a third passage means to receive air from said second passage, said device having a back, a front spaced from said back, a top and a bottom, a passage guide means extending from said bottom upwardly and spaced forwardly from said back to thereby provide said third passage, a container in said device having a bottom and a back spaced from said device back providing an outlet, said guide means providing a front for said container, a heat exchanger having fins spaced apart extending above said container, said back outlet communicating with said fins and said third passage areas.

2. Heat exchange apparatus as set forth in claim 1, said fins embodying extensions extending into said container.

3. Heat exchange apparatus as set forth in claim 1, said fins having trough portions extending to a point above said container whereby fluid from said fins may pass into said container.

4. Heat exchange apparatus as set forth in claim 1, and a baffle in said back outlet to thereby restrict the space.

5. Heat exchange apparatus as set forth in claim 1, said heat exchange device front being spaced below said device top and having a guide member between the top of said device and said fins thereby providing an outlet for the escape of air from said heat exchange device.

6. Heat exchange apparatus as set forth in claim 1, and conduit means communicating with said container and adapted to communicate with a liquid supply source whereby to supply said container with liquid.

References Cited

UNITED STATES PATENTS

| | | | |
|---|---|---|---|
| 1,332,923 | 3/1920 | Shurtleff | 237—78 X |
| 1,972,109 | 9/1934 | Riebel et al. | 261—127 |
| 2,337,518 | 12/1943 | Young et al. | 165—122 X |
| 3,366,169 | 1/1968 | Laing | 165—122 X |

ROBERT A. O'LEARY, Primary Examiner

THEOPHIL W. STREULE, Assistant Examiner